(No Model.) 2 Sheets—Sheet 1.

L. L. GRIFFIN.
ROAD CAR.

No. 423,242. Patented Mar. 11, 1890.

Witnesses
E. C. Duffy
Chas. M. Werle

Inventor
L. L. Griffin
By his Attorney O. E. Duffy (No Model.) 2 Sheets—Sheet 2.

L. L. GRIFFIN.
ROAD CAR.

No. 423,242. Patented Mar. 11, 1890.

Witnesses
E. C. Duffy
Chas. M. Werle

Inventor
L. L. Griffin
By his Attorney O. E. Duffy

UNITED STATES PATENT OFFICE.

LEANDER L. GRIFFIN, OF SCRANTON, PENNSYLVANIA.

ROAD-CAR.

SPECIFICATION forming part of Letters Patent No. 423,242, dated March 11, 1890.

Application filed November 27, 1889. Serial No. 331,762. (No model.)

*To all whom it may concern:*

Be it known that I, LEANDER L. GRIFFIN, of Scranton, in the county of Lackawanna and State of Pennsylvania, have invented certain new and useful Improvements in Road-Cars; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to certain improvements in road-cars.

The object of the invention is to provide a road-car adapted for use as a traveling store or sales-wagon, or for use as a highway dining and living car. These objects are accomplished by, and my invention consists in, certain novel features of construction, and in combination of parts more fully described hereinafter, and particularly pointed out in the claims.

Figure 1:
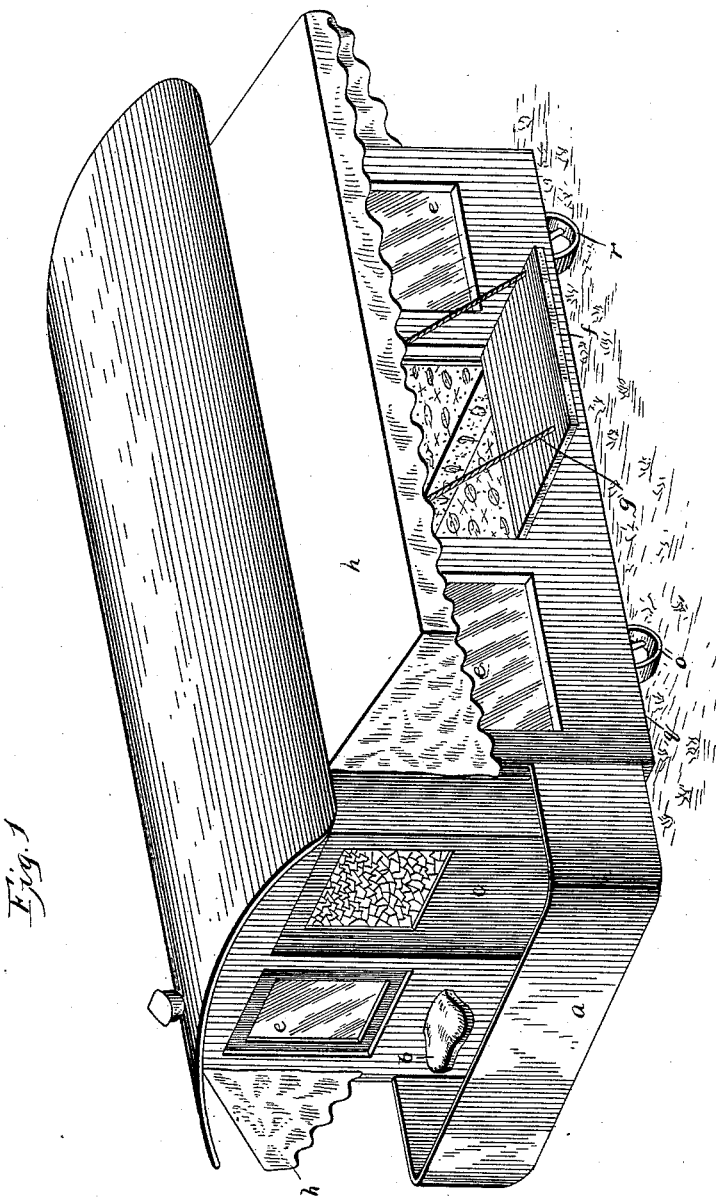
Figure 2:
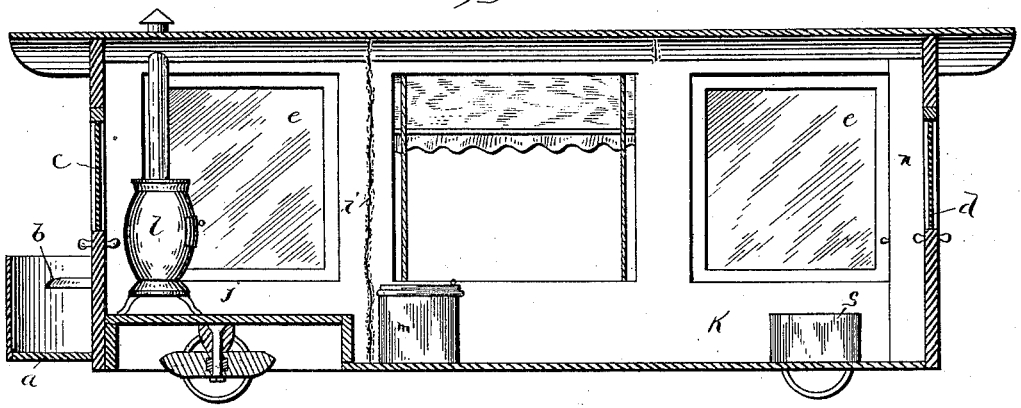
Figure 3:
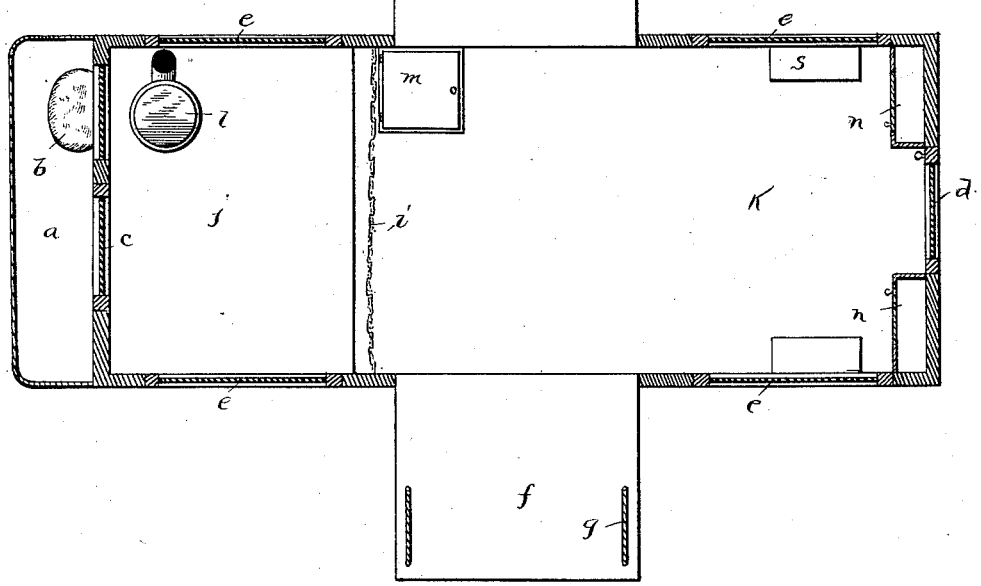

Referring to the accompanying drawings, Figure 1 is a perspective of the car. Fig. 2 is a vertical longitudinal section. Fig. 3 is a horizontal longitudinal section.

In practice this car is preferably constructed of about the same dimensions as an ordinary street-car, and the car is inclosed and provided with a suitable roof, and with a front platform $a$ and suitable seat $b$ for a driver, also with suitable front end door $c$, opening into the front or driver's platform. The car can also be provided with a rear end door $d$ and side end windows $e$ $e$. The opposite sides of the car are also provided with the central drop windows or doors $f$ $f$, provided with suitable supports $g$, so that the windows or doors can be swung up and closed, or can be supported in the horizontal positions shown to serve as counters for selling or displaying goods when the car is used as a movable store, or to admit light and air, or for other purposes when the car is used for dining and living purposes. The sides of the car are also provided with swinging frames, which carry awnings $h$, extending longitudinally along and above the sides of the car, as shown, to protect the inmates of the car or the goods on the hangers or windows $f$ from the sun.

The interior of the car is divided by drawn curtains $i$ into two rooms or compartments, one $j$ for culinary purposes, and the other $k$ for living and dining purposes or as a salesroom.

The interior of the car can be provided with a stove $l$, a refrigerator or ice-box $m$, and suitable closets $n$.

The front wheels $o$ of the car are mounted on a truck or bolster $p$, pivoted to the car so as to rock vertically and horizontally, and the sides of the car at the ends of said truck and wheels are extended down, as shown at $g$, to partially hide and inclose the wheels. The floor of the car in rear of said truck and front wheels is lowered to within six or eight inches of the ground, and the axles or hubs of the rear wheels $r$ $r$ are about level with the floor of the car, and said wheels extend up into boxes $s$, extending up into the body of the car, as shown, and serving as tables. The rear as well as the front wheels are thus hidden.

The great advantages and many uses to which such a car can be put are obvious. The car is particularly adapted for the sale of refreshments, &c., at fair-grounds or around the country, and also is particularly adapted for the use of camping parties.

What I claim is—

1. The herein-described inclosed road-car having suitable doors and windows, and its interior arranged to be capable of division into several separate compartments, having its floor lowered, except at the front, the sides being extended down at the front, the rear wheels extending up through the floor, boxes inclosing the same, and a pivoted and rocking truck or bolster carrying the front wheels and located beneath the front portion of the floor and within said sides, substantially as described.

2. The herein-described inclosed rectangular road-car having a door and windows, and its interior arranged to be capable of division into separate compartments, the partially-lowered floor, front and rear wheels, and the drop-windows on both sides of the car and provided with supports to hold them in a horizontal position, for the purposes set forth.

In testimony that I claim the foregoing as my own I affix my signature in presence of two witnesses.

LEANDER L. GRIFFIN.

Witnesses:
C. S. JACOBS.
JAMES A. RIELLEY.